United States Patent
Chen et al.

(10) Patent No.: US 12,047,312 B2
(45) Date of Patent: Jul. 23, 2024

(54) TWO-STAGE PHYSICAL SIDELINK CONTROL CHANNEL (PSCCH) FOR SIDELINK COMMUNICATIONS

(71) Applicant: MediaTek Singapore Pte. Ltd., Singapore (SG)

(72) Inventors: Tao Chen, Beijing (CN); Chien Hwa Hwang, Hsinchu (TW); Chien-Yi Wang, Hsinchu (TW); Ju-Ya Chen, Hsinchu (TW); Pei-Kai Liao, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 400 days.

(21) Appl. No.: 17/431,563

(22) PCT Filed: Feb. 18, 2020

(86) PCT No.: PCT/CN2020/075701
§ 371 (c)(1),
(2) Date: Aug. 17, 2021

(87) PCT Pub. No.: WO2020/169024
PCT Pub. Date: Aug. 27, 2020

(65) Prior Publication Data
US 2022/0140964 A1    May 5, 2022

(30) Foreign Application Priority Data
Feb. 18, 2019    (WO) ................ PCT/CN2019/075362

(51) Int. Cl.
*H04L 5/00* (2006.01)
(52) U.S. Cl.
CPC .......... *H04L 5/0042* (2013.01); *H04L 5/0005* (2013.01); *H04L 5/0048* (2013.01); *H04L 5/0053* (2013.01)

(58) Field of Classification Search
CPC ... H04L 5/0042; H04L 5/0005; H04L 5/0048; H04L 5/0053; H04L 43/0829;
(Continued)

(56) References Cited

U.S. PATENT DOCUMENTS

| 9,974,077 B2 | 5/2018 | Sartori et al. |
| 2016/0073408 A1 | 3/2016 | Sartori et al. |

(Continued)

FOREIGN PATENT DOCUMENTS

| CN | 107466068 A | 12/2017 |
| CN | 107615844 A | 1/2018 |

(Continued)

OTHER PUBLICATIONS

International Search Report and Written Opinion issued on May 22, 2020 in PCT/CN2020/075701 filed on Feb. 18, 2020, 7 pages.
(Continued)

*Primary Examiner* — Sudesh M Patidar
(74) *Attorney, Agent, or Firm* — Helen Mao; Imperium Patent Works (57) ABSTRACT

A method of two-stage sidelink control information (SCI) for sidelink transmission is described. In one novel aspect, the SCI is transmitted from a transmission UE (Tx UE) to a reception UE (Rx UE) in two stages. In one embodiment, the 1st-stage SCI carries information related to channel sensing, and is transmitted over a physical sidelink control channel (PSCCH). The 2nd-stage SCI is transmitted over a physical sidelink shared channel (PSSCH) associated with the PSCCH. In one embodiment, the first-stage SCI includes priority information or information of time-frequency resources for the SL transmission. In another embodiment, the first-stage SCI indicates time-frequency location of the second-stage SCI.

16 Claims, 5 Drawing Sheets

(58) Field of Classification Search
CPC ............ H04L 43/0823; H04L 43/0847; H04L 43/0876; H04L 43/0894; H04L 67/36; H04W 76/14; H04W 4/40; H04W 4/42; H04W 4/44; H04W 4/46; H04W 4/48; H04W 4/70; H04W 4/80; H04W 4/30; H04W 4/021; H04W 72/0453; H04W 72/044; H04W 76/11; H04W 76/18; H04W 24/10; H04W 24/08; G16Y 10/40; G16Y 40/10; G16Y 40/30; G16Y 40/35; G16Y 40/40; G16Y 40/50; G16Y 40/60; B60R 2300/00; G08G 1/00

See application file for complete search history.

(56) References Cited

U.S. PATENT DOCUMENTS

| | | |
|---|---|---|
| 2017/0048905 A1 | 2/2017 | Yun et al. |
| 2017/0289733 A1 | 10/2017 | Rajagopal et al. |
| 2017/0353819 A1 | 12/2017 | Yin et al. |
| 2018/0139724 A1 | 5/2018 | Loehr et al. |
| 2018/0368090 A1* | 12/2018 | Kadambar ............ H04W 8/005 |
| 2019/0007974 A1 | 1/2019 | Nguyen |
| 2020/0106566 A1* | 4/2020 | Yeo ........................ H04W 28/04 |
| 2020/0260472 A1* | 8/2020 | Ganesan ................ H04W 72/20 |
| 2020/0367204 A1* | 11/2020 | Li .......................... H04L 1/0004 |
| 2021/0204250 A1* | 7/2021 | Ashraf ................... H04W 4/40 |
| 2022/0104238 A1* | 3/2022 | Aiba ...................... H04L 5/0053 |

FOREIGN PATENT DOCUMENTS

| | | |
|---|---|---|
| CN | 109088707 A | 12/2018 |
| WO | WO 2017/171437 A1 | 10/2017 |
| WO | WO-2020033704 A1 * | 2/2020 |

OTHER PUBLICATIONS

Combined Taiwanese Office Action and Search Report issued Dec. 18, 2020 in Patent Application No. 109105143, 7 pages.
Combined Chinese Office Action and Search Report issued on Apr. 22, 2023 in Chinese Patent Application No. 202080001379.1 (with translation of category of cited documents), 10 pages.

* cited by examiner

TWO-STAGE PHYSICAL SIDELINK CONTROL CHANNEL (PSCCH) FOR SIDELINK COMMUNICATIONS

INCORPORATION BY REFERENCE

This present application claims the benefit of International Application No. PCT/CN2019/075362, "Control Channel Design for V2X Communication" filed on Feb. 18, 2019, which is incorporated herein by reference in its entirety.

TECHNICAL FIELD

The present disclosure relates to wireless communications, and specifically relates to sidelink communications.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cellular based vehicle-to-everything (V2X) (e.g., LTE V2X or NR V2X) is a radio access technology developed by the Third Generation Partner Project (3GPP) to support advanced vehicular applications. In V2X, a direct radio link (referred to as a sidelink) can be established between two vehicles. The sidelink can operate under the control of a cellular system (e.g., radio resource allocation) when the vehicles are within the coverage of the cellular system. Or, the sidelink can operate independently when no cellular system is present.

SUMMARY

Aspects of the disclosure provide a method for sidelink transmission. The method can include obtaining a SCI related configuration received from a base station or a pre-configuration, and transmitting from a transmission user equipment (Tx UE) to a reception user equipment (Rx UE) a transport block with two-stage sidelink control information (SCI) including a 1st-stage SCI and a 2nd-stage SCI. The 1st-stage SCI carries information related to channel sensing, and is transmitted over a physical sidelink control channel (PSCCH). The 2nd-stage SCI and/or the transport block are transmitted over a physical sidelink shared channel (PSSCH). The PSSCH is associated with the PSCCH.

In an embodiment, the information related to channel sensing includes one of priority information of the transport block, or information of time-frequency resource assignment for transmission of the transport block.

In an embodiment, the 1st-stage SCI has a same payload size for unicast, groupcast, and broadcast. In an embodiment, the 1st-stage SCI has a predefined time/frequency location, and a same number of resource elements for unicast, groupcast, and broadcast. In an embodiment, the 1st-stage SCI indicates time/frequency location of the 2nd-stage SCI. In an embodiment, the 1st-stage SCI indicates a number of resource elements carrying the 2nd-stage SCI, or an aggregation level of the 2nd-stage SCI. In an embodiment, the 1st-stage SCI indicates a modulation and coding scheme (MCS) of the PSSCH. In an embodiment, the 1st-stage SCI includes antenna ports information including at least one of: a number of antenna ports, one or more indices of antenna ports. In an embodiment, the 1st-stage SCI include a demodulation reference signal (DMRS) pattern associated with the PSSCH.

In an embodiment, the 2nd-stage SCI includes a source identifier (ID) of the Tx UE and/or the destination ID of the Rx UE. The source ID or the destination ID can be scrambled with a cyclic redundancy check (CRC) of the 2nd-stage SCI. In an embodiment, the 1-stage SCI includes a format indicator to indicate whether a single SCI or a two-stage SCI is used for transmitting the transport block. In an embodiment, the 1-stage SCI includes a radio network temporary identifier (RNTI) or a physical layer ID (L1-ID) to indicate whether a single SCI or a two-stage SCI is used for transmitting the transport block. In an embodiment, the 1-stage SCI includes information to indicate whether a single SCI is used for broadcast communication of the transport block, or a two-stage SCI is used for unicast or groupcast communication of the transport block.

Aspects of the disclosure provide an apparatus for sidelink transmission. The apparatus includes circuitry configured to obtain a SCI related configuration received from a base station or a pre-configuration, and transmit from a Tx UE to a Rx UE a transport block with two-stage SCI including a 1st-stage SCI and a 2nd-stage SCI. The 1st-stage SCI carries information related to channel sensing, and is transmitted over a PSCCH. The 2nd-stage SCI and/or the transport block are transmitted over a PSSCH. The PSSCH is associated with the PSCCH.

Aspects of the disclosure provide a non-transitory computer-readable medium storing instructions that, when executed by a processor, cause the processor to perform the method of sidelink transmission.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
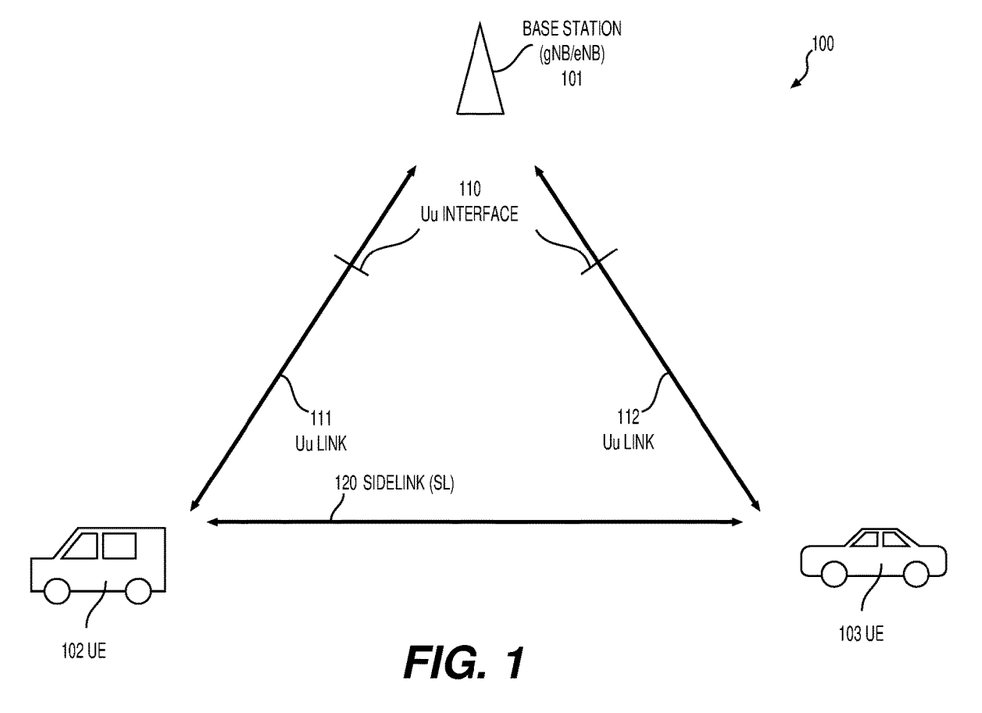
FIG. 1 shows a wireless communication system 100 according to an embodiment of the disclosure.

FIG. 1 shows a wireless communication system 100 according to an embodiment of the disclosure. The system 100 can include a base station (BS) 101, a first user equipment (UE) 102, and a second UE 103. The BS 101 can be an implementation of a gNB specified in the 3rd Generation Partnership Project (3GPP) New Radio (NR) standards, or can be an implementation of an eNB specified in 3GPP Long Term Evolution (LTE) standards. Accordingly, the BS 101 can communicate with the UE 102 or 103 via a radio air interface 110 (referred to as a Uu interface 110) according to respective wireless communication protocols. Alternatively, the BS 101 may implement other types of standardized or non-standardized radio access technologies, and communicate with the UE 102 or 103 according to the respective radio access technologies. The UE 102 or 103 can be a vehicle, a computer, a mobile phone, a roadside unit, and the like.

The UEs 102 and 103 can communicate with each other based on vehicle-to-everything (V2X) technologies specified in 3GPP standards. A direct radio link 120, referred to as a sidelink (SL), can be established between the UEs 102 and 103. The UE 102 can use a same spectrum for uplink transmissions over a Uu link 111 and sidelink transmissions over the sidelink 120. Similarly, the UE 103 can use a same spectrum for uplink transmissions over a Uu link 112 and SL transmissions over the sidelink 120. In addition, allocation of radio resources over the sidelink 120 can be controlled by the BS 101.

Different from the FIG. 1 example (in-coverage scenario) where the UEs 102 and 103 performing sidelink communications are under network coverage (the coverage of a cell of the BS 101), in other examples, UEs performing sidelink communications can be outside of network coverage. For example, a sidelink can be established between two UEs both of which are located outside of network coverage (out-of-coverage scenario), or one of which is located outside of network coverage (partial-coverage scenario).

In some examples, a group of UEs (such as the UEs 102 and 103) in a local area may communicate with each other using sidelinks under or without control of a base station. Each UE in the group may periodically or aperiodically transmits messages to neighboring UEs. In addition, the respective transmissions can be unicast, groupgast, or broadcast. For example, hybrid automatic repeat request (HARQ) and link adaptation mechanisms can be employed at a Tx UE to support unicast or groupcast between the Tx UE and a target UE(s).

Figure 2:
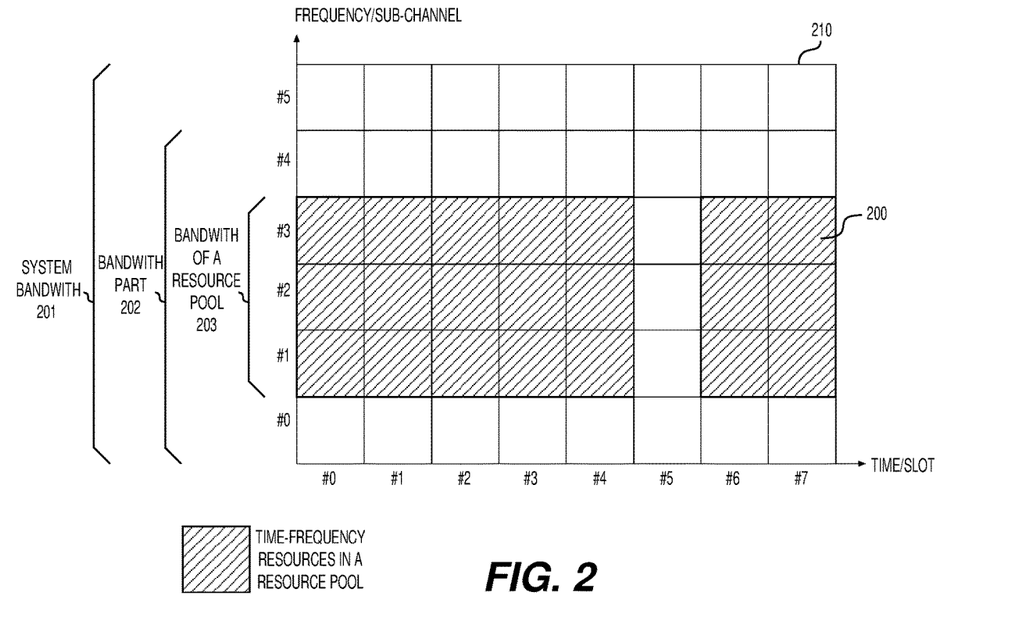
FIG. 2 shows an example of a resource pool 200 configured for sidelink communications according to an embodiment of the disclosure.

FIG. 2 shows an example of a resource pool 200 configured for sidelink communications according to an embodiment of the disclosure. For example, the resource pool 200 can be configured to the UE 102 from the BS 101, or can be pre-configured to the UE 102 (e.g., a resource pool configuration is stored in a universal integrated circuit card (UICC) of the UE 102). The resource pool 200 can be defined over a time-frequency (slot/sub-channel) resource grid 210. Radio resources for transmission of physical channels (e.g., physical sidelink control channel (PSCCH), physical sidelink shared channel (PSSCH), and the like) from the UE 102 on the sidelink 120 can be allocated based on the resource pool 200.

As shown, a system bandwidth 201 of the UE 102 can include sub-channels #0-#6. Each sub-channel may include a number of physical resource blocks (PRBs) (e.g., 5, 10, or 20 PRBs). The resource pool 200 can include a set of consecutive (or non-consecutive) sub-channels #1-#3 in frequency domain. If the UE 102 operates in a bandwidth part (BWP) 203, the sub-channels of the resource pool 200 can be configured to be in the BWP 203. In time domain, the resource pool 200 can include a number of slots (e.g., slots #0-#4 and #6-#7) that can be consecutive or non-consecutive in different examples.

Resource pools can be (pre-)configured to the UE 102 separately from the transmission perspective (Tx pools) and the reception perspective (Rx pools). Accordingly, the UE 102 can monitor for PSCCHs, and hence receive respective PSSCH transmissions from other UEs in a Rx pool while performing transmissions in a Tx pool, such as the resource pool 200.

In an embodiment, two resource allocation modes (Mode 1 and Mode 2) can be used for allocating radio resources for PSCCH and PSSCH transmissions over a sidelink. In Mode 1, the BS 101 performs the function of resource scheduling. For example, the BS 101 can provide dynamic grants of sidelink resources, or semi-statically configured grants of periodic sidelink resources (referred to as sidelink configured grants) to the UE 101 for sidelink communications over the sidelink 120.

A dynamic sidelink grant can be provided in a downlink control information (DCI), and schedule resources for an initial transmission of a transport block, and optionally, retransmissions of the same transport block. The retransmissions can be blindly repeated transmissions, or can be retransmissions in response to a HARQ feedback. In one example, resources for each transmission or retransmission can be spanned over one or more sub-channels but limited within one slot in the sidelink resource pool 200.

For a sidelink configured grant, the scheduled resources can be a set of sidelink resources recurring with a periodicity. Activation or deactivation signaling via DCI can be employed to start or terminate usage of the sideling configured grant.

When the UE 102 is in an out-of-coverage status, or the UE 102 is in an in-coverage status but instructed by the BS 101, Mode 2 can be employed for resource scheduling (resource allocation). In Mode 2, the UE 102 can autonomously select resources for sidelink transmissions based on a sensing procedure. For example, the UE 102 can sense, within a (pre-)configured resource pool, which resources are not in use by other UEs with higher-priority traffic, and select an appropriate amount of resources for sidelink initial transmissions and, optionally, retransmissions. In the selected such resources, the UE can transmit and re-transmit a certain number of times.

For example, the UE 102 can reserve resources to be used for a number of blind (re-)transmissions or HARQ-feedback-based (re-)transmissions of a transport block. The UE 102 can also reserve resources to be used for an initial transmission of a later transport block. The reserved resources can be indicated in the SCI(s) scheduling the respective transport block. Alternatively, an initial transmission of a transport block can be performed after sensing and resource selection, but without a reservation.

SCIs (e.g., 1st-stage SCI) transmitted by UEs on PSCCH indicate selected time-frequency resources in which the respective UE will transmit a PSSCH. (The indicated time-frequency resources can be allocated with either Mode 1 or Mode 2.) These SCI transmissions can be used by the sensing UE 102 to maintain a record of which resources have been reserved by other UEs in the recent past. When a resource selection is triggered (e.g. by traffic arrival or a resource re-selection trigger), the UE 102 considers a sensing window which starts a (pre-)configured time in the past and finishes shortly before the trigger time. The sensing UE 102 also measures, for example, the PSSCH-RSRP over selected or reserved resources in the slots of the sensing window. The measurements can indicates a level of interference which would be experienced if the sensing UE 102 were to transmit in the selected or reserved resources.

The sensing UE 102 can then select resources for transmission(s) or retransmission(s) from within a resource selection window. For example, the resource selection window starts after the trigger for transmission, and cannot be longer than a remaining latency budget of a to-be-transmitted transport block. Based on the SCIs from the other UEs and the measurements as described above, selected or reserved resources by the other UEs in the selection window with PSSCH-RSRP above a threshold are excluded from being candidates by the sensing UE 102. The threshold can be set according to priorities of the traffic (e.g., priorities associated with respective transport blocks) of the sensing UEs and the other transmitting UEs. Thus, a higher priority transmission from the sensing UE 102 can occupy resources which are reserved by a transmitting UE with sufficiently low PSSCH-RSRP and sufficiently lower-priority traffic.

From the set of resources in the selection window which have not been excluded, the sensing UE can identify a certain percentage (e.g., 20%) of the available resources within the window as candidate resources. The UE 102 may select from the candidate resources for a number of initial- or re-transmissions of the to-be-transmitted transport block, for example, in a random way.

Figure 3:
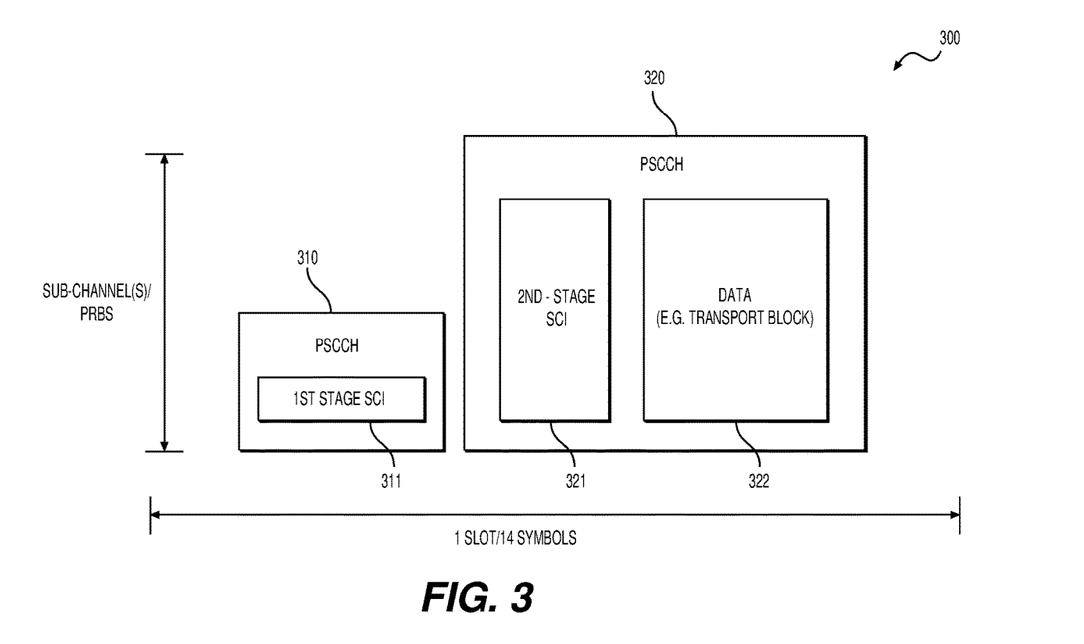
FIG. 3 shows an example of a sidelink transmission 300 with a two-stage sidelink control information (SCI) according to an embodiment of the disclosure.

FIG. 3 shows an example of a sidelink transmission 300 with a two-stage SCI according to an embodiment of the disclosure. In the sidelink transmission 300, a PSCCH 310 and a PSSCH 320 associated with the PSCCH 310 can be generated and transmitted from the UE 102. The PSCCH 310 can carry a 1st-stage SCI 311, while the PSSCH 320 can carry a 2nd-stage SCI 321 and data 322 (e.g., data of a transport block).

In one example, the UE 102 can be configured to perform each transmission or retransmission of a transport block or data within a slot in time domain. Accordingly, as shown in FIG. 3, resources for transmitting PSCCH 310 and PSSCH 320 can be selected in a Tx resource pool within a slot in time domain and several sub-channels in frequency domain. A slot may include 14 symbols but may have different duration depending on respective sub-carrier spacings. For example, corresponding to different sub-carrier spacings 15 kHz, 30 kHz, or 60 kHz, a 1-ms subframe may include 1, 2, or 4 slots each including 14 symbols.

In other examples, the PSCCH 310 and the PSSCH 320 may be transmitted in different slots. Accordingly, resources for transmitting PSCCH 310 and PSSCH 320 can be selected from different slots in a Tx resource pool.

In FIG. 3, the PSCCH 310 and the PSSCH 320 are shown to be time-division multiplexed. However, in other examples, the PSCCH 310 and the PSSCH 320 can be frequency-division multiplexed. For example, within the bandwidth of the assigned sub-channels in FIG. 3, the resources above the PSCCH 310 can also be assigned for transmission of the PSSCH 320.

In the FIG. 3 example, the two-stage SCI is used for the sidelink transmission 300 that can be unicast, groupcast, or broadcast. When the UE 102 is conducting a unicast or groupcast transmission, the 1st-stage SCI 311 can be for sensing purpose and targets all UEs neighboring the Tx UE 102 (all UEs refers to UEs can be reached by the 1st-stage SCI 311). Thus, the 1st-stage SCI 311 can carry information related to channel sensing, and is transmitted in a broadcast manner (e.g., low coding rate) such that the 1st-stage SCI 311 can be decodable by all the neighboring UEs. In contrast, the 2nd-stage SCI 321 can target UEs involved in the unicast or groupcast communications (the target UEs are a subset of all UEs). Thus, the 2nd-stage SCI 321 can carry information needed for decoding the data 322, and may be transmitted with HARQ schemes and link adaptation based on channel conditions between the Tx UE 102 and the target UEs. A high coding rate may be used for transmitting the 2nd-stage SCI 321 to improve spectra efficiency.

For example, the sensing related information (information related to channel sensing) can include time-frequency resource allocation information, and/or priority information. The time-frequency resource allocation information can indicate time-frequency resources assigned for an initial transmission of the data 322, or reserved for a number of retransmissions of the data 322 in the respective Tx resource pool. In one example, the time-frequency resource allocation information in the 1st-stage SCI 311 can be indicated separately with two fields: time resource assignment and frequency resource assignment. The priority information can provide a priority associated with the transport block of the data 322. The priority may be determined according to a quality of service (QoS) level assigned to a packet flow. The transport block includes data of the packet flow.

Based on the time-frequency resource allocation information carried in the 1st-stage SCI 311, a sensing UE can know which resources will be used by the Tx UE 102 in a Tx resource pool. Based on the priority information, the sensing UE can set a measurement threshold for measuring interference strength over the selected or reserved resources. Accordingly, the sensing UE can perform a sensing procedure properly.

The 1st-stage SCI 311 can also carry port information and/or demodulation reference signal (DMRS) pattern information. For example, one or more antenna ports can be used for transmission of the PSSCH 320. A number of antenna ports (an amount of the used antenna ports) can be indicated in the 1st-stage SCI 311. And/or, one or more indices of the used antenna ports can be indicated in the 1st-stage SCI 311. In addition, different DMRS patterns can be used for transmitting the PSSCH 320, for example, depending on a relative speed between the Tx UE 102 and a receiving UE. Thus, which DMRS pattern is in use can be indicated in the 1st-stage SCI 311. The port information and the DMRS pattern information carried in the 1st-stage SCI 311 can be used by a receiving UE to decode the 2nd-stage SCI 321 as well as the data 322 carried in the PSSCH 320.

The 2nd-stage SCI 321 may carry information for decoding the data 322, such as a new data indicator for indicating an original transmission or a retransmission, or a redundancy version (RV) for soft-combined demodulation.

In an embodiment, the 1st-stage SCI 311 can have a fixed size for unicast, groupcast, or broadcast. In addition, the 1st-stage SCI 311 can have a fixed aggregation level. In other words, the 1st-stage SCI 311 can have a fixed number of resource elements (REs) for transmission. Further, a time/frequency location(s) of the resources assigned for the 1st-stage SCI 311 can be preconfigured to be fixed. With the fixed size, number of REs, and time/frequency location(s), a sensing UE or a receiving UE can decode the 1st-stage SCI 311 without blind detection for the decoding. Decoding complexity can thus be reduced.

In an embodiment, the 2nd-stage SCI 321 can have a fixed size. During unicast or groupcast communications, link adaptation can be adopted for transmission of the 2nd-stage SCI 321 resulting in different aggregation levels (or different number of REs). To avoid or reduce complexity of blind detection of the 2nd-SCI 321 at a receiving UE, the 1st-SCI 311 can indicate the aggregation levels (or the number of REs) of the 2nd-stage SCI 321, and/or time/frequency location of the 2nd-stage SCI 321. The two-stage SCI transmission can thus take advantage of link adaptation for transmission of the 2nd-stage SCI 321 without increasing decoding complexity. In contrast, a single stage transmission of SCI with link adaptation would incur blind decoding, thus increasing decoding complexity.

Other embodiments related with two-stage SCI are described below.

In an embodiment, two-stage SCI is used to support unicast and groupcast. For example, a physical layer of LTE V2X can support broadcast over sidelinks. Destinations cannot be identified in the physical layer. In contrast, NR V2X can support unicast and groupcast in physical layer. In some scenarios, it is desirable that only intended UEs (or target UEs) decode a unicast or groupcast PSSCH. The unintended UEs can power down for the rest of a respective TTI. Such requirement can be fulfilled by conveying a destination ID in an SCI associated with the unicast or groupcast transmission.

Including a destination ID in an SCI is straightforward but increases control overhead (e.g. increase SCI size). In contrast, a UE-specific RNTI (for unicast) and a group RNTI (for groupcast) can be RRC configured, and scrambled with a CRC of the SCI, which do not occupy control resources. However, CRC scrambling by RNTI prevent other UEs from decoding the PSCCH to obtain sensing related information (e.g., resource allocation of an associated PSSCH, or resource reservation for retransmission). For autonomous resource selection in Mode 1, it is necessary for a receiving UE to learn resource locations occupied by other UEs.

To resolve the problem, two-stage SCI can be used in the following way in a particular embodiment. For example, a 1st-stage SCI may include location of time-frequency resources used by a PSSCH, resource reservation for retransmissions, priority information, destination UE ID, or group UE ID. A 2nd-stage SCI contains the rest of SCI. The 1st-stage SCI and the 2nd-stage SCI can be encoded separately. No CRC scrambling is performed on the 1st-stage SCI so that all neighboring UEs can decode the 1st-stage SCI for sensing purpose. In addition, the destination ID included in the 1st-stage SCI can indicate an intended receiving UE so that the unintended UEs can avoid decoding the 2nd-stage SCI. The 2nd-stage SCI can be CRC scrambled by source UE ID/group ID (or UE-specific/group RNTI) so that only the intended UEs can learn the 2nd-stage SCI and further decode the PSSCH. The 1st-stage SCI can be carried by a PSCCH and the 2nd-stage SCI can be either piggybacked on the PSSCH or carried in the PSCCH in different examples.

Table 1 shows an example of a two-stage SCI in comparison with a single SCI. The single SCI has a size of 104 bits including 24 bits of CRC. For the two-stage SCI, a 1st-stage SCI has a size of 60 bits including CRC bits, while a 2nd-stage SCI has a size of 44 bits including CRC bits. A source ID is carried implicitly by CRC scrambling in the 2nd-stage SCI. There is no increase on the information bits for the two-stage SCI compared with the single SCI. It is noted that the SCI of format 1 in LTE V2X has a size of 48 bits which is much smaller than the example single SCI payload size 104 bits. The large payload size for the single SCI may cause worse (coverage) performance compared to the SCI in LTE V2X, which is not desirable.

TABLE 1

Single SCI vs. Two-stage SCI

| | | Two-stage SCI | |
|---|---|---|---|
| Parameters | Single SCI | 1st-stage SCI | 2nd-stage SCI |
| Source ID | 24 | 0 | (24) (CRC scrambled) |
| Destination ID (up to 24)[1] | 24 | 24 | 0 |
| Other SCI payload[2] | 32 | 12 | 20 |
| CRC bits | 24 | 24 | 24 |
| sub-total | 104 | 60 | 44 |
| Total | 104 | 104 | |

[1]16 or 24 bits are assumed for L2 Dest ID as defined in TS36.321.
[2]32 bits are assumed based on LTE V2X SCI format 1.

Two-stage SCI can provide a better coverage enhancement compared with single SCI due to a smaller SCI size of each stage. Table 2 shows simulation results for different types of SCIs (1st-stage SCI of 60 bits, 2nd-stage SCI of 44 bits, and single SCI of 104 bits) transmitted with different aggregation levels (AL). Two test cases with different TDL-C delay spread (DS) (30 ns and 300 ns) are simulated. As shown, 2-7 dB gain can be achieved by two-stage SCI. A gain may depend on a size of the SCI payload, and the aggregation levels.

TABLE 2

SNR @ 1% BLER

| | TDL-C DS = 30 ns | | | | | TDL-C DS = 300 ns | | | | |
|---|---|---|---|---|---|---|---|---|---|---|
| | | | | Two-stage vs Single SCI Gain (dB) | | | | | Two-stage vs Single SCI Gain (dB) | |
| | 1st- | 2nd- | | | | 1st- | 2nd- | | | |
| Aggregation Level | stage SCI (60 bits) | stage SCI (44 bits) | Single SCI (104 bits) | 1st-stage SCI gain | 2nd-stage SCI gain | stage SCI (60 bits) | stage SCI (44 bits) | Single SCI (104 bits) | 1st-stage SCI gain | 2nd-stage SCI gain |
| AL2 | 3.5 | 1.3 | 8.2 | 4.7 | 6.9 | 4.5 | 1.6 | 8.8 | 4.3 | 7.2 |
| AL4 | −1.5 | −3.2 | 1.2 | 2.7 | 4.4 | −2.2 | −4.1 | 0.5 | 2.7 | 4.6 |
| AL8 | −4.6 | −5.9 | −2.3 | 2.3 | 3.6 | −5.8 | −7.2 | −3.5 | 2.3 | 3.7 |
| AL16 | −6.8 | −8.1 | −4.8 | 2 | 3.3 | −8.4 | −9.7 | −6.5 | 1.9 | 3.2 |

Table 3 shows another example of a two-stage SCI compared with a single SCI. As shown, a 1st-stage SCI and a 2nd-stage SCI can have an equal size of 53 bits. A format indicator (e.g., 1 bit) is used for differentiation between the 1st-stage SCI and the 2nd-stage SCI. In Table 3 example, both a source ID and a destination ID may be carried in the 2nd-stage SCI with CRC scrambled by the source ID and/or the destination ID to reduce a total overhead (bits).

TABLE 3

Single SCI vs. Two-stage SCI

| Parameters | Single SCI | Two-stage SCI | |
|---|---|---|---|
| | | 1st-stage SCI | 2nd-stage SCI |
| Format indicator | 0 | 1 | 1 |
| Source ID | 24 | 0 | 24 |
| Destination ID (16 or 24) | 24 | 0 | 0 |
| | | | (CRC scrambled) |
| Other SCI payload[1] | 32 | 28 | 4 |
| CRC | 24 | 24 | 24 |
| sub-total (bits) | 104 | 53 | 53 |
| Total (bits) | 104 | 106 | |

Note:
[1]32 bits for SCI payload are assumed based on LTE V2X.

Since unicast, groupcast, and broadcast traffic have different characteristics, content of SCI can be tailored for different traffic types. All traffic types can occur simultaneously, so an indicator of SCI format can be employed in various embodiments.

In an embodiment, a single SCI is used for broadcast transmission without carrying a destination ID. The size of the single SCI can thus be reduced. Accordingly, a single SCI, a 1st-stage SCI and a 2nd-stage SCI can have a same size but with different information fields. Reserved bits in each format can be used to indicate a respective format. For example, a 2-bit format indicator may be used in SCI to differentiate whether it is a 1st-stage SCI (broadcast), 2nd-stage SCI or a single SCI.

In an embodiment, both a 1st-stage SCI and a single SCI can be supported by having a same SCI size with different information fields (but with a different size than a 2nd-stage SCI). A format indicator can be used to differentiate whether it is the 1st-stage SCI or the single SCI. In addition, in an example, the two-stage SCI is used for the unicast/groupcast communications whereas the single SCI is used for broadcast communication. Accordingly, the format indicator can indicate whether it is unicast/groupcast or broadcast and implicitly determine the corresponding SCI format (single SCI or two-stage SCI).

In an embodiment, instead of using a format indicator field, an RNTI or a physical layer ID (L1-ID) can be used to differentiate two-stage SCI from single SCI. For example, a first RNTI (or L1-ID) and a second RNTI (or L1-ID) can be associated with single SCI and two-stage SCI, respectively, and assigned to UEs. For example, when RNTIs are used, the first or second RNTI can be scrambled with a CRC of a single SCI or a 1st-stage SCI. A receiving UE can thus determine a received SCI is a single SCI or a 1st-stage SCI by testing whether the first RNTI or second RNTI is scrambled with the CRC.

In an embodiment, the same information fields are used for a 1st-stage SCI and a single SCI by having a format indicator for the presence of the 2nd-stage SCI to differentiate the single SCI and two-stage SCI. For example, the 1st-stage SCI carries one of more of the followings: the format indicator, time-frequency resource allocation, priority information, resource reservation, time gap between initial transmission and retransmission, or MCS. The 2nd-stage SCI carries one or more of the followings: source ID, RV, new data indicator, HARQ process number, or destination ID. The format indicator can indicate whether there is the 2nd-stage SCI. To share the same size for a 1st-stage SCI and a single SCI (mainly for broadcast), a CRC in the 2nd-stage SCI can be scrambled by a destination ID rather than in the 1st-stage SCI. Accordingly, all UEs can decode the 1st-stage SCI, while UEs of unicast/groupcast can decode 2nd-stage SCI and UEs of broadcast need not to decode the 2nd-stage SCI (but can decode the 1st-stage SCI for sensing purpose).

In an embodiment, a 2nd-stage SCI in two-stage SCI can be implemented similarly to enhanced PDCCH (E-PDCCH) in LTE by occupying time/frequency resources of data channel (PDSCH) resources. The 2nd-stage SCI can be transmitted together with the data channel without occupying the dedicated control channel resources.

In an embodiment, for two-stage SCI, a 1st-stage SCI can have fixed size, aggregation level, and pre-defined time/frequency location(s) and be transmitted with broadcast to be sensed by all neighboring UEs (with respect to UEs of unicast/groupcast) without blind detection for decoding. The 2nd-stage SCI can have a fixed size but adaptive aggregation levels for control channel link adaption in the unicast/groupcast links. To avoid blind detection for the 2nd-stage SCI decoding, the adaptive aggregation level and/or the time/frequency location of the 2nd-stage SCI can be indicated by the 1st-stage SCI to avoid blind detection. In contrast, a single SCI solution may have a tradeoff between link adaption and blind decoding complexity, and may not use link adaptation without blind decoding as in two-stage SCI.

Figure 4:
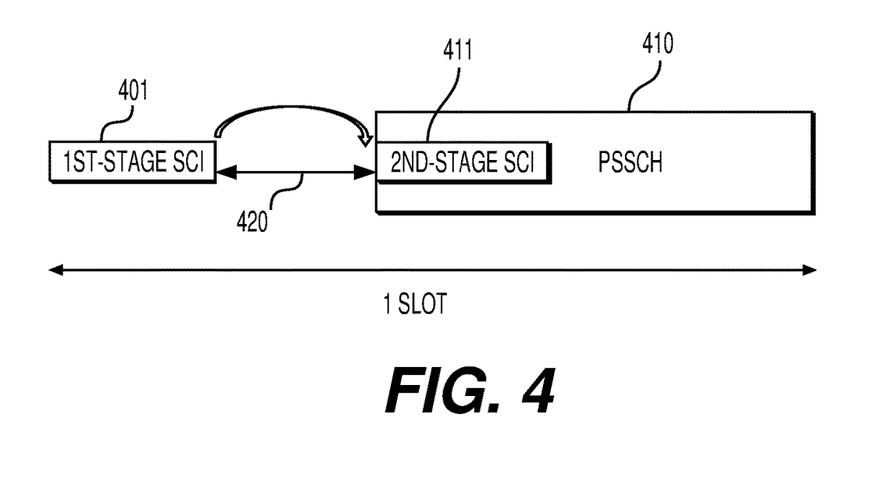
FIG. 4 shows an example of two-stage SCI for sidelink transmission according to an embodiment of the disclosure.

FIG. 4 shows an example of two-stage SCI for sidelink transmission according to an embodiment of the disclosure. A 1st-stage SCI 401 carried in a PSCCH can schedule a PSSCH 410 by cross-symbol scheduling in a same slot. The 1st-stage SCI 401 can carry time-frequency location information of the PSSCH 410 and the aggregation level/time-frequency location of an associated 2nd-stage SCI 411 carried in the PSSCH 410. A time gap 420 between the 1st-stage SCI 401 and the PSSCH 410 (and the 2nd-stage SCI 411) can be one or a few symbols. Based on decoding results of the 1st-stage SCI, receiving or sensing UEs can determine whether and how to perform resource selection in the remaining symbols of the slot not occupied by the PSSCH 410. In an example, there is no gap between the symbols carrying the 1st-stage SCI 401 and the PSSCH 410.

Figure 5:
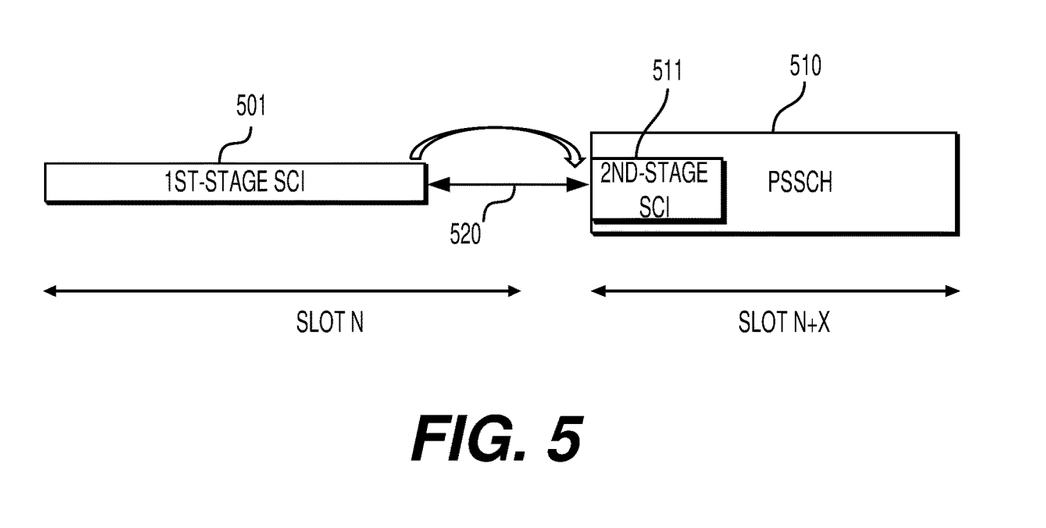
FIG. 5 shows another example of two-stage SCI for sidelink transmission according to an embodiment.

FIG. 5 shows another example of two-stage SCI for sidelink transmission according to an embodiment. A 1st-stage SCI 501 carried in a PSCCH can schedule a PSSCH 510 by cross-slot scheduling. As shown, the 1st-stage SCI 501 can be located at slot N, while the PSSCH 510 carrying a 2nd-stage SCI 511 can be located at a different slot, slot N+X. A time gap 520 between the 1st-stage SCI 501 and the PSSCH 510 (and the 2nd-stage SCI 511) can be one or more (N) slots. Receiving or sensing UEs can decode the 1st-stage SCI at slot N and determine whether and how to perform resource selection based on contents of the 1st-stage SCI.

In an embodiment, two-stage SCI is employed for side-link transmissions, and resources scheduled by a 1st-stage SCI can be a group of resources or resources following a pattern in a resource pool for initial transmission or retransmissions of a transport block. For example, multiple such resource patterns in a resource pool can be configured to a transmitting UE, and one of those configured pattern can be indicated in the 1st-stage SCI. Receiving UEs may perform the resource selection according to such resource pool or pattern after decoding the 1st-stage SCI.

Whether and how to use two-stage SCI or single SCI can be based on a configuration received from a network or BS, or a pre-configuration at a respective UE (e.g., stored in a UICC). In other words, the UE may obtain a SCI related configuration received from a base station or a pre-configuration. In addition, switching between two-stage SCI and single SCI can be supported by RRC, medium access control (MAC), and/or physical layer signaling.

In an embodiment, for scheduling with two-stage SCI or single SCI, both same-slot (same-symbol or cross-symbol) and cross-slot scheduling can be supported. The purpose of the cross-slot scheduling is to ensure sensing UEs can have sufficient time to decode SCI for sensing and apply sensing results for resource selection. For the same-slot scheduling, it may be beneficial to reduce the transmission latency but with the drawback that other sensing UEs cannot have enough time to decode SCI (for cross-symbol same-slot scheduling, it may depend on UE hardware processing capability) and apply the sensing results especially for the aperiodic traffic case.

When both the same-slot and cross-slot scheduling are used, some indicators can be carried in DMRS associated with respective 1st-stage SCI or single SCI to differentiate the same-slot and cross slot scheduling. Based on the indicators, control channel decoding can be avoided during a sensing procedure. For example, initialization values for DMRS sequence generation can be a function of the indicator(s) for indication of the same-slot (even differentiation for the same-symbol or cross-symbol scheduling) or cross-slot scheduling. The indicators may also imply or indicate the processing time requirement to apply sensing results for a respective sensing UE. By detecting the DMRS to obtain an indicator, a sensing UE can know whether it is feasible to apply the results of SCI decoding for resource selection according to the sensing UE's processing capability. If not feasible, the sensing UE can give up decoding of such SCI for power and computing resource saving. If feasible, the sensing UE can further decode such SCI for sensing purpose.

In an embodiment, two-stage SCI can be used to enable interference cancellation at a receiving UE. For example, port information (port numbers and/or number of ports) and/or DMRS pattern information for PSSCH transmission can be carried in a respective SCI (e.g., 1st-stage SCI or single SCI). The receiving UE can decode the 1st-stage SCIs (of transmitting UEs) to obtain respective port information and DMRS pattern information. Accordingly, the receiving UE can know whether and how to perform channel estimation for a respective channel with consideration of cancellation of interference from other transmissions. Furthermore, MCS information can also be used for data part (PSSCH) interference cancellation.

In an embodiment, single SCI may be used for broadcast communication with a common RNTI or L1-ID for indication, whereas two-stage SCI may be used for the unicast/groupcast communication with UE- or group-specific L1-ID or RNTI for indication. For example, RNTI or L1-ID can be scrambled with a CRC of a single SCI or a 1st-stage SCI for indication. A receiving UE can verify whether a received SCI is single SCI or 1st-stage SCI by checking the CRC with the RNTI and L1-ID configured to the receiving UE. In an embodiment, whether to use a L1-ID or a RNTI may depend on whether a transmitting UE is in-coverage or out-of-coverage. For example, an RNTI can be used when in-coverage while an L1-ID can be used when out-of-coverage.

Figure 6:
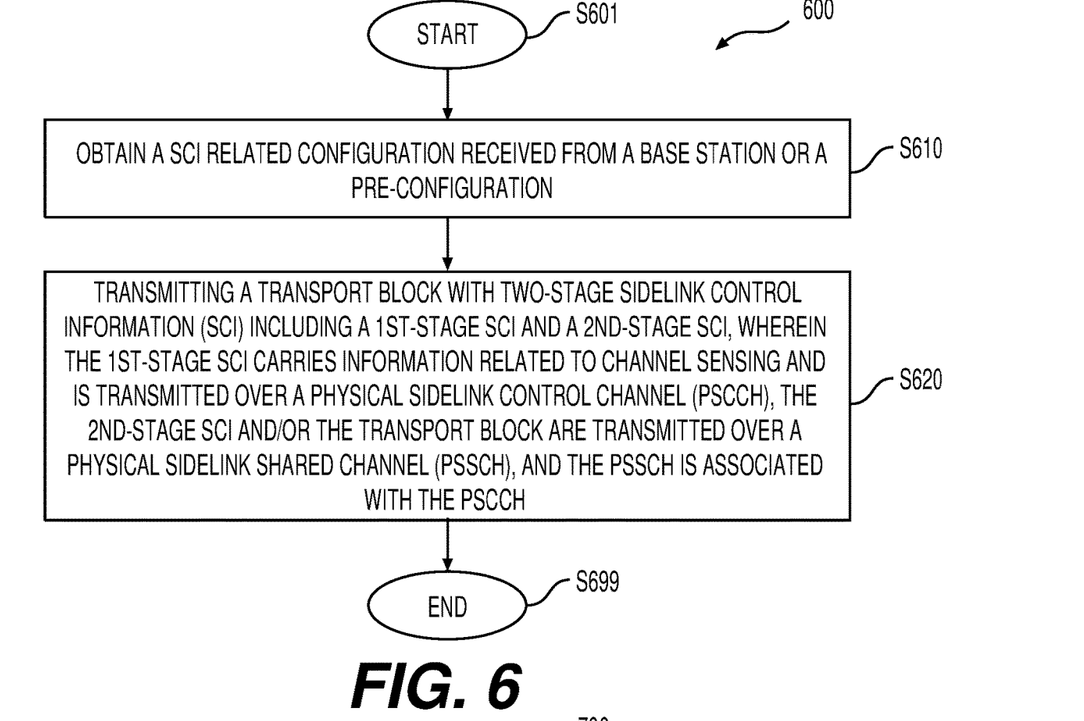
FIG. 6 shows a process 600 of sidelink transmission with two-stage SCI according to an embodiment of the disclosure.

FIG. 6 shows a process 600 of sidelink transmission with two-stage SCI according to an embodiment of the disclosure. The process 600 can start from S601, and proceed to S610.

At S610, a SCI related configuration can be obtained by a Tx UE, for example, received from a base station or a pre-configuration of the Tx UE.

At S620, A transport block can be transmitted from the Tx UE to a Rx UE. The transport block can be received and processed at a physical layer of the Tx UE. For example, the transport block is generated at a transport layer in a protocol stack and carried in a transport channel (referred to as sidelink shared channel (SL-SCH)). A two-stage SCI including a 1st-stage SCI and a 2nd-stage SCI can be used for the transmission. The 1st-stage SCI carries information related to channel sensing, and is transmitted over a PSCCH. The 2nd-stage SCI and/or the transport block are transmitted over a PSSCH. The PSSCH is associated with the PSCCH. The process 600 proceeds to S699, and terminates at S699.

Figure 7:
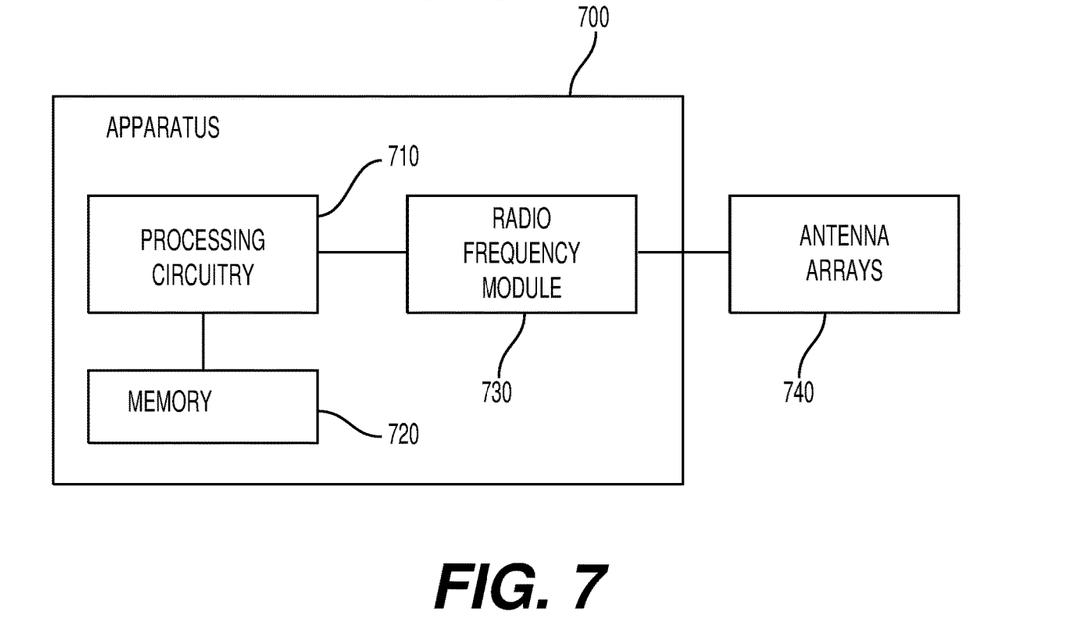
FIG. 7 shows an exemplary apparatus 700 according to embodiments of the disclosure.

FIG. 7 shows an exemplary apparatus 700 according to embodiments of the disclosure. The apparatus 700 can be configured to perform various functions in accordance with one or more embodiments or examples described herein. Thus, the apparatus 700 can provide means for implementation of mechanisms, techniques, processes, functions, components, systems described herein. For example, the apparatus 700 can be used to implement functions of UEs or BSs in various embodiments and examples described herein. The apparatus 700 can include a general purpose processor or specially designed circuits to implement various functions, components, or processes described herein in various embodiments. The apparatus 700 can include processing circuitry 710, a memory 720, and a radio frequency (RF) module 730.

In various examples, the processing circuitry 710 can include circuitry configured to perform the functions and processes described herein in combination with software or without software. In various examples, the processing circuitry 710 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 710 can be a central processing unit (CPU) configured to execute program instructions to perform various functions and processes described herein. Accordingly, the memory 720 can be configured to store program instructions. The processing circuitry 710, when executing the program instructions, can perform the functions and processes. The memory 720 can further store other programs or data, such as operating systems, application programs, and the like. The memory 720 can include non-transitory storage media, such as a read only memory (ROM), a random access memory (RAM), a flash memory, a solid state memory, a hard disk drive, an optical disk drive, and the like.

In an embodiment, the RF module 730 receives a processed data signal from the processing circuitry 710 and converts the data signal to beamforming wireless signals that are then transmitted via antenna arrays 740, or vice versa. The RF module 730 can include a digital to analog converter (DAC), an analog to digital converter (ADC), a frequency up convertor, a frequency down converter, filters and amplifiers for reception and transmission operations. The RF module 730 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 740 can include one or more antenna arrays.

The apparatus 700 can optionally include other components, such as input and output devices, additional or signal processing circuitry, and the like. Accordingly, the apparatus 700 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
obtaining a sidelink control information (SCI) related configuration received from a base station or by a UE pre-configuration;
transmitting from a transmission user equipment (Tx UE) to a reception user equipment (Rx UE) data of a transport block with two-stage SCI including a 1st-stage SCI and a 2nd-stage SCI based on the SCI related configuration, wherein
the 1st-stage SCI carries information related to channel sensing, and is transmitted over a physical sidelink control channel (PSCCH) to the RX UE, and wherein the information related to channel sensing includes one of: priority information of the transport block; or information of time-frequency resource assignment for transmission of the transport block, and wherein the 1st-stage SCI has a predefined time-frequency location, and a same number of resource elements for unicast, groupcast, and broadcast,
at least one of the 2nd-stage SCI or the data is transmitted over a physical sidelink shared channel (PSSCH) to the RX UE; and
performing data transceiving with the Rx UE based on the $1^{st}$-stage SCI and the $2^{nd}$-stage SCI.

2. The method of claim 1, wherein the 1st-stage SCI has a same payload size for unicast, groupcast, and broadcast.

3. The method of claim 1, wherein the 1st-stage SCI indicates time-frequency location of the 2nd-stage SCI.

4. The method of claim 1, wherein the 1st-stage SCI indicates a number of resource elements carrying the 2nd-stage SCI, or an aggregation level of the 2nd-stage SCI.

5. The method of claim 1, wherein the 1st-stage SCI indicates at least one of a modulation and coding scheme (MCS) of the PSSCH, or the 1st-stage SCI include a demodulation reference signal (DMRS) pattern associated with the PSSCH.

6. The method of claim 1, wherein the 1st-stage SCI includes antenna ports information including at least one of: a number of antenna ports, one or more antenna ports.

7. The method of claim 1, wherein the 2nd-stage SCI includes at least one of a source identifier (ID) of the Tx UE or a destination ID of the Rx UE.

8. The method of claim 7, wherein the source ID or the destination ID is scrambled in a cyclic redundancy check (CRC) of the 2nd-stage SCI.

9. The method of claim 1, wherein the 1st-stage SCI includes a format indicator to indicate whether a single SCI or a two-stage SCI is used for transmitting the transport block.

10. The method of claim 1, wherein the 1st-stage SCI includes a radio network temporary identifier (RNTI) or a physical layer ID (L1-ID) to indicate whether a single SCI or a two-stage SCI is used for transmitting the transport block.

11. The method of claim 1, wherein the 1st-stage SCI includes information to indicate whether a single SCI is used for broadcast communication of the transport block, or a two-stage SCI is used for unicast or groupcast communication of the transport block.

12. An apparatus, comprising circuitry configured to:
obtain a sidelink control information (SCI) related configuration received from a base station or by a UE pre-configuration;
transmit from the apparatus to a reception user equipment (Rx UE) data of a transport block with two-stage SCI including a 1st-stage SCI and a 2nd-stage SCI based on the SCI related configuration, wherein
the 1st-stage SCI carries information related to channel sensing, and is transmitted over a physical sidelink control channel (PSCCH) to the RX UE, and wherein the information related to channel sensing includes one of: priority information of the transport block; or information of time-frequency resource assignment for transmission of the transport block, and wherein the 1st-stage SCI has a predefined time-frequency location, and a same number of resource elements for unicast, groupcast, and broadcast, at least one of the 2nd-stage SCI or the data is transmitted over a physical sidelink shared channel (PSSCH) to the RX UE; and perform data transceiving with the Rx UE based on the $1^{st}$-stage SCI and the $2^{nd}$-stage SCI.

13. The apparatus of claim 12, wherein the 1st-stage SCI has a same payload size for unicast, groupcast, and broadcast.

14. The apparatus of claim 12, wherein the 1st-stage SCI indicates time-frequency location of the 2nd-stage SCI.

15. The apparatus of claim 12, wherein the 1st-stage SCI indicates a number of resource elements carrying the 2nd-stage SCI, or an aggregation level of the 2nd-stage SCI.

16. A non-transitory computer-readable medium storing instructions that, when executed by a processor, cause the processor to perform a method, the method comprising:

a sidelink control information (SCI) related configuration received from a base station or by a UE pre-configuration;

transmitting from a transmission user equipment (Tx UE) to a reception user equipment (Rx UE) data of a transport block with two-stage SCI including a 1st-stage SCI and a 2nd-stage SCI based on the SCI related configuration, wherein the 1st-stage SCI carries information related to channel sensing, and is transmitted over a physical sidelink control channel (PSCCH) to the RX UE, and wherein the information related to channel sensing includes one of: priority information of the transport block; or information of time-frequency resource assignment for transmission of the transport block, and wherein the 1st-stage SCI has a predefined time-frequency location, and a same number of resource elements for unicast, groupcast, and broadcast, at least one of the 2nd-stage SCI or the data is transmitted over a physical sidelink shared channel (PSSCH) to the RX UE;

and performing data transceiving with the Rx UE based on the $1^{st}$-stage SCI and the $2^{nd}$-stage SCI.

* * * * *